United States Patent [19]

Margetts et al.

[11] 4,189,191
[45] Feb. 19, 1980

[54] CONTROL VALVE ASSEMBLIES FOR HYDRAULIC BRAKING SYSTEMS

[75] Inventors: Hugh G. Margetts, Warwickshire; Andrew J. Assinder, Redditch, both of England

[73] Assignee: Girling Limited, Brimingham, England

[21] Appl. No.: 873,694

[22] Filed: Jan. 30, 1978

[30] Foreign Application Priority Data

Jan. 29, 1977 [GB] United Kingdom ............... 3756/77

[51] Int. Cl.² .............................................. B60T 15/06
[52] U.S. Cl. ..................................... 303/52; 60/550; 60/591; 303/6 A
[58] Field of Search ................. 60/550, 582, 591; 91/28, 460; 188/16, 354; 303/6 R, 6 A, 52

[56] References Cited

U.S. PATENT DOCUMENTS 3,727,986 4/1973 Koivunen ..................... 60/550 X
3,827,765 8/1974 Husted ............................ 303/52

Primary Examiner—Stephen G. Kunin
Attorney, Agent, or Firm—Scrivener, Parker, Scrivener and Clarke

[57] ABSTRACT

A control valve assembly for a vehicle dual hydraulic braking system in which hydraulic fluid from a distributor chamber can be supplied to one or both of a pair of outlets for connection to brakes on opposite sides of a vehicle. The assembly incorporates a pressure control valve operable to supply fluid under pressure to the chamber from an outlet for connection to a pressure source, irrespective of whether one or both of two separate brake-applying valves are to be operated, and a one-way valve is located on the upstream side of the pressure control valve to prevent flow in a reverse direction. A back-up piston works in a bore in communication with the chamber, and is provided to pressurize fluid in the chamber after an exhaust valve has closed and a pressure control valve has opened.

5 Claims, 4 Drawing Figures

CONTROL VALVE ASSEMBLIES FOR HYDRAULIC BRAKING SYSTEMS

This invention relates to improvements in control valve assemblies for vehicle dual hydraulic braking systems of the kind commonly used on agricultural tractors and like vehicles in which separate brake-applying valves are operable independently and simultaneously to cause hydraulic fluid from a distributor chamber to be supplied to one or both of a pair of outlets for connection to brakes or wheels on opposite sides of a vehicle.

The brake-applying valves can be operated simultaneously for retarding the vehicle or separately for steering.

In known control valve assemblies of the kind set forth the chamber is supplied with fluid from an inlet for connection to a pressure source, conveniently a pump, and difficulty is experienced in maintaining a brake-applying force upon failure of the source during a brake application.

According to our invention a control valve assembly of the kind set forth incorporates a pressure control valve which is operable to supply fluid under pressure to the chamber from an inlet for connection to a pressure source, irrespective of whether one or both brake-applying valves are to be operated, a one-way valve is located on the upstream side of the pressure control valve to prevent flow from the chamber in a reverse direction, a back-up piston working in a bore in communication with the distributor chamber is provided to pressurise fluid in the distributor chamber after the pressure control valve has opened, and an exhaust valve which controls communication between the chamber and the bore and an exhaust port for connection to a reservoir for fluid and which closes before the control valve can open.

Thus in the event of failure of the pressure source, fluid trapped in the distributor chamber by the one-way valve can be pressurised by the back-up piston to continue that brake application, after the exhaust valve has closed.

Preferably the brake-applying valves and the back-up piston are operated through a common mechanism which is conveniently actuated by one or both of a pair of pedals.

In one construction the brake-applying valves, the one-way valve, the pressure control valve and the exhaust valve are incorporated in a common housing having a longitudinal bore in which the back-up piston works and which communicates with the distributor chamber when the pressure control valve is open, otherwise the bore is in communication with the exhaust port through the exhaust valve which is adapted to be closed by the mechanism, before the pressure control valve opens.

Some embodiments of our invention are illustrated in the accompanying drawings in which.

Figure 1:
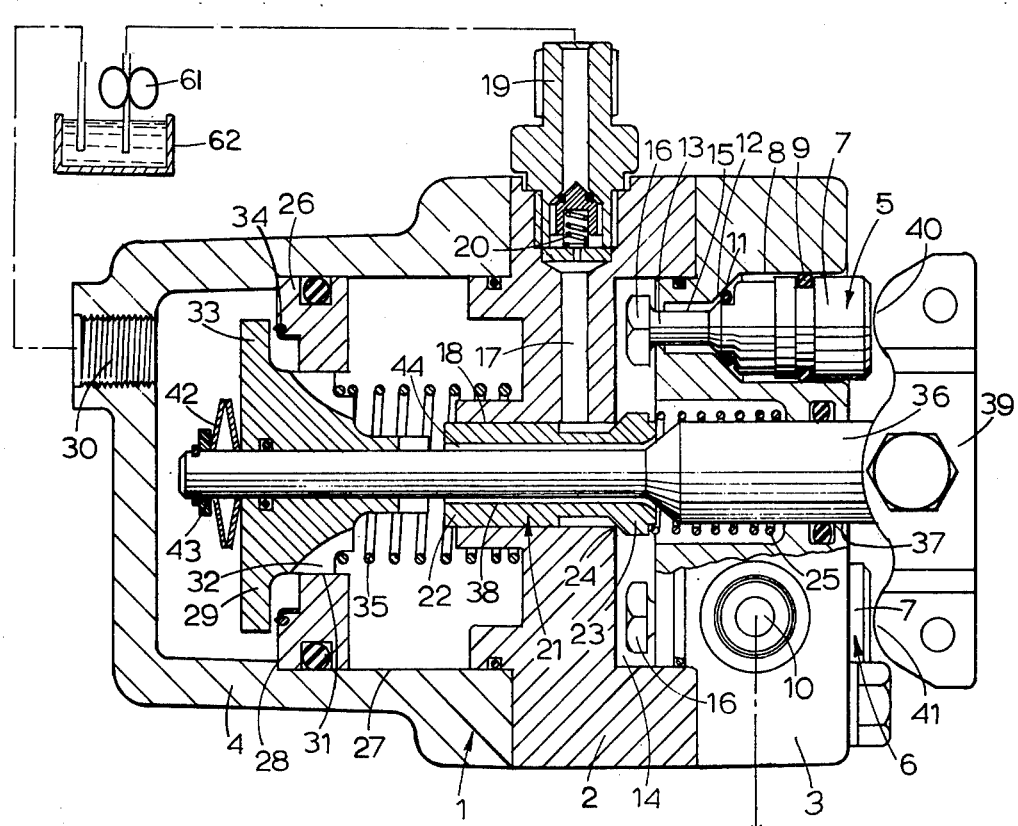
FIG. 1 is a longitudinal section through a control valve assembly for a vehicle dual hydraulic braking system.

The control valve assembly of FIG. 1 comprises a housing 1 comprising an annular body part 2 which is clamped between a valve block 3 and a cup-shaped cylinder 4.

A pair of brake-applying valves 5 and 6 are mounted in the valve block 3, and each valve 5, 6 comprises a spool 7 which works in a bore 8 and projects at its outer end from the block 3. Each spool 7 carries a radial seal 9 which seals with a portion of the bore on the axially outer side of a radial outlet passage 10 for connection to brakes 63 on one side of the vehicle, and the spool 7 has an inner inclined end carrying a seal 11 for engagement with a seating 12 defined by a complementary face at the inner end of the bore 8. The inner end of each spool 7 carries an axial extension 13 which projects into a distribution chamber 14 defined between the body part 2 and the block 3 through a passage 15 of a diameter greater than that of the extension 13. The free end of the extension 13 carries an enlarged head 16 forming a stop to limit movement of the spool 7 in an outward direction.

The body part 2 includes a radial inlet passage 17 which connects a bore 18 at the centre of the body part 2 with a union 19 for connection to a high pressure pump 61 through a one-way valve 20 which is housed in the inner end of the union 19.

Communication between the inlet passage 17 and the distributor chamber 14 is controlled by a pressure control valve 21. The control valve 21 comprises a hollow plunger 22 which is guided to slide in the bore 18 and has an enlarged valve head 23 which is located in the chamber 14 and which is normally urged into a closed position in engagement with a complementary seating 24 in the body part 2 by means of a compression spring 25 in abutment with the valve block 3 to isolate the inlet passage 17, and in consequence the pump 61, from the chamber 14.

An annular back-up piston 26 of substantial diameter works in the cylindrical bore 27 of the cylinder 4 and movement of the piston 26 away from the body part 2 is limited by a radial stop face 28 in the housing. A valve stop member 29 of generally mushroom outline comprises with the piston 26 an exhaust valve for controlling communication between the bore 27 and an exhaust port 30 in the end wall of the cylinder 4 for connection to a reservoir 62 for fluid for the pump 61. The valve member 29 has an axially apertured or notched stem 32 which is guided to slide in the central bore 31 in the annular piston 26 and a radial flange 33 which is normally urged away from an annular seal 34 in the face of the piston 26 adjacent to the closed outer end of the cylinder 4 by means of a compression spring 35 in abutment with the body part 2.

The valve member 29 is mounted on one end of an operating rod 36 which extends through a bore 37 in the valve block 3 and an axial clearance bore 38 in the valve plunger 22. The opposite outer end of the rod 36 is pivotally connected to substantially the mid-point in the length of a rocking lever 39 of which each opposite end is pivotally connected through a suitable linkage to one of a pair of pedals which can be operated separately or simultaneously conveniently by latching the pedals together. The inner face of the lever 39 adjacent to the valve block 3 is provided with arcuate abutment portions 40 and 41 which are normally urged inwardly into engagement with the outer ends of the spools 7 of the valve 5 and 6 to hold the valves in the closed position with the seals 11 engaging with the seatings 12. The abutments 40 and 41 are urged inwardly by the force in the spring 35 which is transmitted through the rod 36 and the force in a pair of opposed Belleville or like spring washers 42 acting between the valve member 29 and an abutment 43 at the free inner end of the rod 36.

In the inoperative position shown in which both the brake applying valves 5 and 6, and the pressure control valve 21 are closed, the exhaust valve is open so that both the cylinder 27 and distributor chamber 14 are in communication with the reservoir, the chamber 14 being in permanent connection with the cylinder 27 through an annular passage 44 between the plunger 22 and the operating rod 36.

When the brakes on opposite sides of the vehicle are to be applied simultaneously for vehicle retardation, both pedals are operated simultaneously and the lever 39 is moved away from the valve block 3 with the rod 36 withdrawn therefrom initially to cause the valve member 29 to engage with the seal 34 in the piston 26. This isolates the cylinder 27 and the distributor chamber 14 from the reservoir 62. Further movement of the rod 36 in the same direction advances the valve member 29 and the piston 26 in the cylinder 27 until the inner end of the stem 32 engages with the plunger 22 to urge the head 23 away from the seating 24. High pressure fluid is then admitted into the chamber 14 through the inlet passage 17. The fluid flows into the cylinder 27 through the annular passage 44 and also flows to the brakes through the outlet ports 10 after the pressure has moved the spools 7 away from the seatings 12.

By providing a common chamber 14 the pressure supplied to both sets of brakes 63 is equalised to prevent differential wear of the linings. When the brakes on the wheels on one side only of the vehicle are to be applied for steering, say those supplied by the valve 6, only one pedal is operated. The rod 36 is still withdrawn to operate the exhaust valve and the control valve 21 as described above but with the lever 39 pivoting about its connection with the rod to urge the abutment 40 into engagement with the spool 7 of the valve 5 to maintain that valve closed and prevent the brakes on opposite sides of the vehicle from being applied.

The distributor chamber 14, and the cylinder 27 on both sides of the piston 26 are normally filled with fluid at atmospheric pressure in the inoperative position. Since the one-way valve 20 prevents a reverse flow of fluid to the pump 61, should the pump 61 fail, the brakes can still be applied by pressurisation at the valve of fluid trapped in the cylinder 27 after the exhaust valve has closed and upon further movement of the piston 26 and the valve member 29 towards the body part 2. In such an event there is a reverse flow of fluid through the annular passage 44.

In this embodiment the whole of the applying force from the rod 36 is transmitted through the seal 34 to the piston 26 which may reduce the effective life of the seal.

Figure 2:
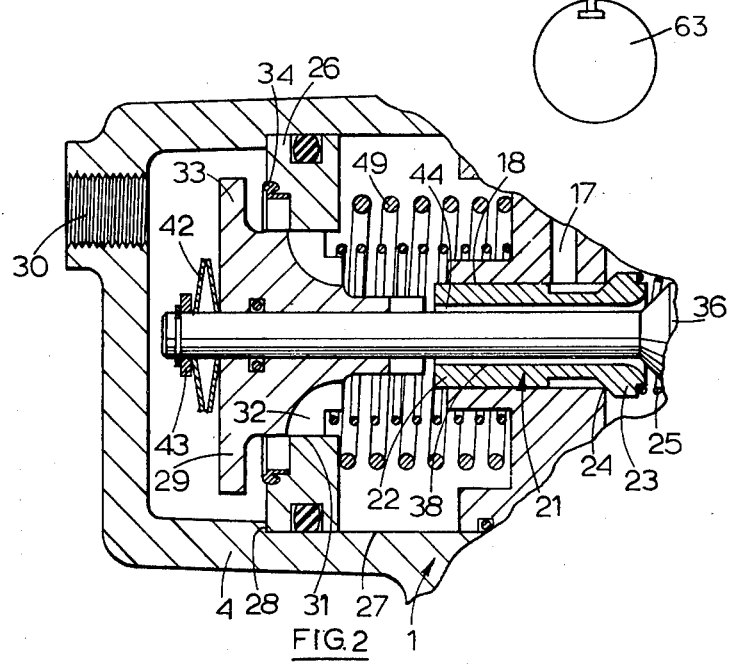
FIG. 2 shows a modification of the exhaust valve of FIG. 1.

In the modified embodiment of FIG. 2 the flange 33 of the valve member is spaced from the seal 34 by a greater distance so that the unapertured portion of the stem 32 adjacent to the flange 33 acts as a skirt to enter the bore 31 and isolate the cylinder 27 from the exhaust port 30 and the valve member 29 acts on the plunger 22 before the flange 33 can engage with the seal 34. Normally the seal 34 will be engaged by the flange 33 only upon failure of the pressure source. In this construction a further spring 49 acts to urge the piston against the stop 28.

Figure 3:
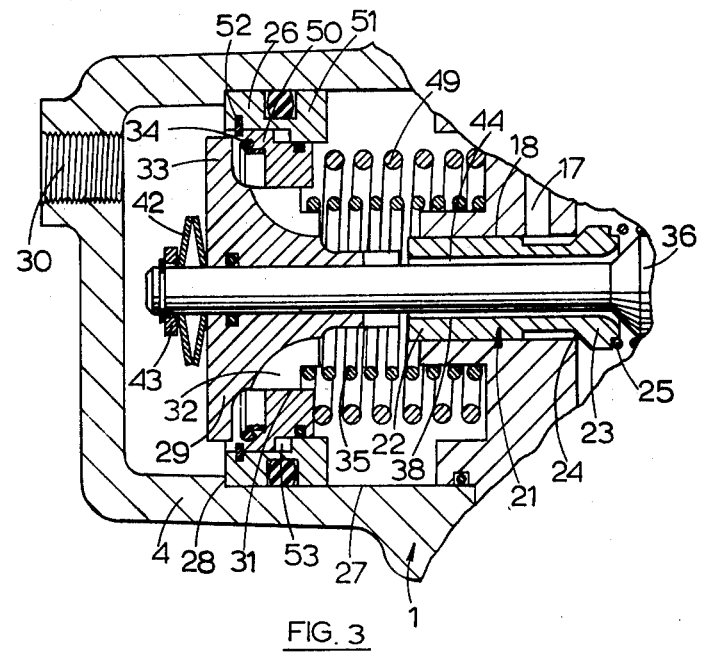
FIG. 3 shows a further modified exhaust valve for the assembly of FIG. 1.

In the modified construction of FIG. 3 the piston 26 comprises inner and outer concentric piston parts 50 and 51 of stepped outline with the seal 34 carried by the inner part 50 and the spring acts to urge the inner part 50 against a stop 52 on the outer part. In such an inoperative position complementary shoulders on the parts 50 and 51 are spaced from each other by a clearance 53.

In operation the flange 33 engages with the seal 34 to close the exhaust valve and initially only the inner piston part 50 of smaller diameter and smaller effective length will be advanced. The axial length of the clearance 53 is greater than the distance through which the valve member 29 must be advanced to operate the plunger so that the seal 34 again will be subjected to the full operating force only after failure of the high pressure source.

Figure 4:
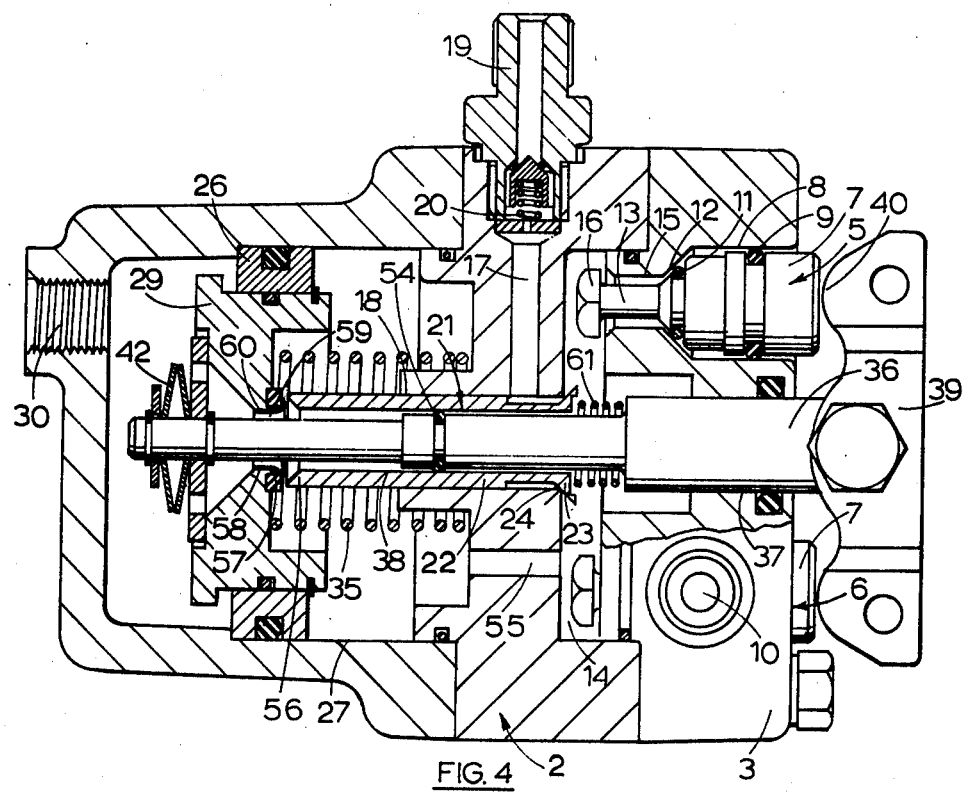
FIG. 4 is a longitudinal section through a further control valve assembly.

In the embodiment of FIG. 4 the rod 36 carries a seal 54 which works in the bore 38 of the plunger 22 and the cylinder 27 and the distributor chamber 14 are in communication through at least one passage 55 in the body part 2. The plunger 22 is extended axially towards the valve member 29 and that end forms a seating 56 for engagement with a seal 57 surrounding an opening 58 in the centre of the valve member 29. The valve member 29 is guided to slide completely through the piston 26 and a clearance 59 is provided between the rod 36 and a retainer 60 which holds the seal 57 in position. A compression spring 61 urges the head 23 into engagement with the seating 24. The hollow plunger 22 therefore acts directly as a part of the control valve 21 and the exhaust valve.

In operation the seal 57 engages with the seating 56 to isolate the reservoir from the cylinder 27 and the chamber 14, and upon further movement of the rod that engagement unseats the head 23.

By reducing the effective diameters of the moving parts, the loads transmitted through the seal 57 are reduced to a minimum.

The construction and operation of the valve assembly of FIG. 4 is otherwise the same as that of FIG. 1 and corresponding reference numerals have been applied to corresponding parts.

We claim:

1. A control valve assembly for a vehicle dual hydraulic braking system comprising means defining an inlet for connection to a source of hydraulic fluid under pressure, means defining a distributor chamber to which fluid is supplied from said inlet, means defining a pair of outlets for connection to brakes on opposite sides of a vehicle, separate brake-applying valves operable independently or simultaneously to cause fluid from said chamber to be supplied to one or both of said outlets respectively, a pressure control valve operative to allow fluid under pressure to be supplied to said distributor chamber from said inlet when at least one of said brake-applying valves is operated, a one-way valve located upstream of said pressure control valve to prevent flow from said chamber in a reverse direction towards said inlet, means defining a bore in communication with said chamber, a back-up piston working in said bore to pressurise fluid in said chamber after said pressure-control valve has opened, a reservoir for fluid, an exhaust port for connection to said reservoir, and an exhaust valve for controlling communication between said chamber, said bore and said exhaust port, said exhaust valve being adapted to close before said control valve can open, wherein said exhaust valve comprises said back-up piston having a central bore, and a valve member, said valve member having an axially apertured stem guided to slide in said bore in said back-up piston and an axially extending radial flange, said flange being adapted to engage with an annular seal on a face of said piston remote from said distributor chamber, to isolate said reservoir from said distributor chamber.

2. A control valve assembly as claimed in claim 1, wherein a portion of said stem adjacent to said flange acts as a skirt to enter said central bore of said piston, to cut off gradually communication between said distributor chamber and said reservoir, said seal being engaged by said flange only upon failure of said pressure source.

3. A control valve assembly as claimed in claim 1, wherein said piston comprises inner and outer concentric parts of stepped outline, said inner part being movable to a limited extent relative to said outer part, with said seal being carried by said inner part, said flange being engageable by said seal to advance said inner part relative to said outer part to isolate said reservoir from said distributor chamber.

4. A control valve assembly for a vehicle dual hydraulic braking system comprising means defining an inlet for connection to a source of hydraulic fluid under pressure, means defining a distributor chamber to which fluid is supplied from said inlet, means defining a pair of outlets for connection to brakes on opposite sides of a vehicle, separate brake-applying valves operable independently or simultaneously to cause fluid from said chamber to be supplied to one or both of said outlets respectively, a pressure control valve operative to allow fluid under pressure to be supplied to said distributor chamber from said inlet when at least one of said brake-applying valves is operated, a one-way valve located upstream of said pressure control valve to prevent flow from said chamber in a reverse direction towards said inlet, means defining a bore in communication with said chamber, a back-up piston working in said bore to pressurise fluid in said chamber after said pressure-control valve has opened, a reservoir for fluid, an exhaust port for connection to said reservoir, and an exhaust valve for controlling communication between said chamber, said bore and said exhaust port, said exhaust valve being adapted to close before said control valve can open, wherein said exhaust valve comprises a valve member, said valve member being guided to slide in a central bore of said back-up piston, said valve member providing communication between said reservoir and said distributor chamber through a central opening, said opening being surrounded by an annular seat, said seat being engageable with a seating to isolate said distributor chamber from said reservoir.

5. A control valve assembly as claimed in claim 4, wherein said seating is provided by a first part of a valve member, a second part of said valve member being engageable with a fixed seating to define said pressure-control valve.

* * * * *